United States Patent
Matthews et al.

(10) Patent No.: US 8,755,271 B2
(45) Date of Patent: Jun. 17, 2014

(54) DYNAMIC MEMORY BANDWIDTH ALLOCATION

(75) Inventors: Brad Matthews, San Jose, CA (US); Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 730 days.

(21) Appl. No.: 13/016,947

(22) Filed: Jan. 28, 2011

(65) Prior Publication Data

US 2012/0195192 A1    Aug. 2, 2012

(51) Int. Cl.
*G01R 31/08* (2006.01)

(52) U.S. Cl.
USPC ......................................................... 370/230

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 6,424,622 | B1 * | 7/2002 | Fan et al. ...................... | 370/230 |
| 6,473,432 | B1 * | 10/2002 | Nishimura et al. ........... | 370/412 |
| 6,657,955 | B1 * | 12/2003 | Bonneau et al. .............. | 370/229 |
| 6,671,258 | B1 * | 12/2003 | Bonneau ....................... | 370/235 |
| 7,870,350 | B1 | 1/2011 | Yu et al. | |
| 7,876,680 | B2 | 1/2011 | Kadambi et al. | |
| 2003/0086372 | A1 * | 5/2003 | Pate et al. ..................... | 370/235 |
| 2003/0095562 | A1 * | 5/2003 | Liu et al. ....................... | 370/442 |
| 2009/0010162 | A1 * | 1/2009 | Bergamasco et al. ......... | 370/235 |
| 2011/0222406 | A1 * | 9/2011 | Persson et al. ................ | 370/236 |
| 2012/0151044 | A1 * | 6/2012 | Luna et al. .................... | 709/224 |

\* cited by examiner

*Primary Examiner* — Jung-Jen Liu
(74) *Attorney, Agent, or Firm* — McDermott Will & Emery LLP

(57) ABSTRACT

Methods and apparatus for dynamic bandwidth allocation are disclosed. An example method includes determining, by a network device, at least one of a congestion state of a packet memory buffer of the network device and a congestion state of an external packet memory that is operationally coupled with the network device. The example method further includes dynamically adjusting, by the network device, respective bandwidth allocations for read and write operations between the network device and the external packet memory, the dynamic adjusting being based on the determined congestion state of the packet memory buffer and/or the determined congestion state of the external packet memory.

19 Claims, 6 Drawing Sheets

| External Congestion State Value | Internal Congestion State Value | Congestion State Index | Read BW Allocation (% of total BW) | Write BW Allocation (% of total BW) |
|---|---|---|---|---|
| 00 | 00 | 0000 | 50 | 50 |
| 00 | 01 | 0001 | 40 | 60 |
| 00 | 10 | 0010 | 20 | 80 |
| 00 | 11 | 0011 | 10 | 90 |
| 01 | 00 | 0100 | 55 | 45 |
| 01 | 01 | 0101 | 40 | 60 |
| 01 | 10 | 0110 | 30 | 70 |
| 01 | 11 | 0111 | 20 | 80 |
| 10 | 00 | 1000 | 70 | 30 |
| 10 | 01 | 1001 | 55 | 45 |
| 10 | 10 | 1010 | 45 | 55 |
| 10 | 11 | 1011 | 40 | 60 |
| 11 | 00 | 1100 | 90 | 10 |
| 11 | 01 | 1101 | 70 | 30 |
| 11 | 10 | 1110 | 55 | 45 |
| 11 | 11 | 1111 | 50 | 50 |

FIG.4

DYNAMIC MEMORY BANDWIDTH ALLOCATION

TECHNICAL FIELD

This description relates to data and network communications.

BACKGROUND

Network devices, such as network switches, may receive packet data on a number of ingress ports, process that packet data and then forward the processed packet data on to corresponding network destinations using a number of egress ports. During packet processing, a network device stores packet data using one or more packet memories, which may be shared by all of the ingress and egress ports of the network device. For example, in one arrangement, a network device may include an internal packet memory as well as being operationally coupled with an external packet memory.

In such implementations, received packet data may be stored in the internal packet memory during processing, buffered in the internal packet memory (such as in a packet buffer) and then written to external packet memory, or may use a combination of internal and external storage. For instance, packet data may be stored internally during normal traffic conditions while using the external packet memory to absorb transient bursts in data traffic. In other situations, the internal packet memory may be simply used to buffer all received packet before writing it out to external packet memory. Of course, a number of other approaches and techniques for storing packet data during processing using an internal packet memory and an external packet memory may be used.

In configurations where at least a portion of packet data being processed by a network device is stored in an external packet memory, implementation of an interface between the network device and the external memory with adequate bandwidth for read and write memory operations between a network device and an external packet memory may be cost prohibitive. For instance, high-speed serializer-deserializer (SERDES) circuits are commonly used to implement such interfaces. These high-speed SERDES circuits affect product cost as they typically use a significant amount of power and, when implemented in an integrated circuit, consume a substantial amount of circuit area. Because such interfaces are often used for handling temporary traffic bursts, which may occur infrequently, the cost of implementing an interface with sufficient bandwidth to handle such traffic bursts may not be cost-effective.

SUMMARY

A method and/or apparatus for bandwidth allocation, as set forth more completely in the claims.

BRIEF DESCRIPTION OF THE DRAWINGS

FIG. 4 illustrates a bandwidth allocation table in accordance with an example embodiment.

DETAILED DESCRIPTION

Figure 1:
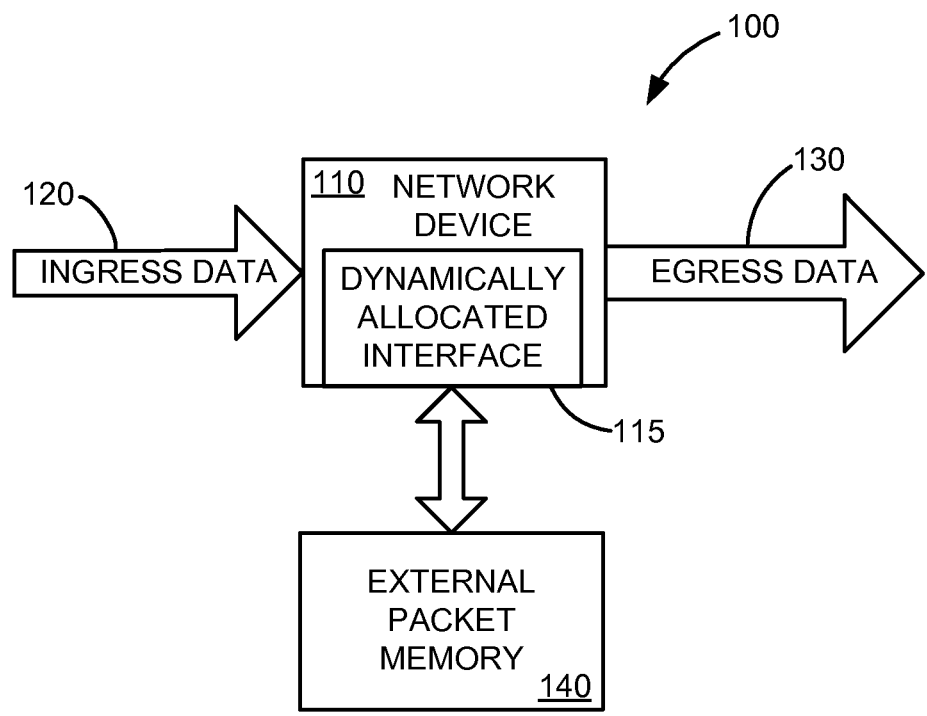
FIG. 1 is a block diagram illustrating a network device and an associated external memory in accordance with an example embodiment.

FIG. 1 is block diagram illustrating a circuit 100 in accordance with an example embodiment. The circuit 100 includes a network device 110. The network device 110 may be a network switch, or other appropriate network device. The network device 110 may receive ingress packet data 120 from a number of other network devices. The ingress data 120 may be received by one or more ingress ports that are included in the network device 110. The network device 110 may be configured to perform various packet processing operations, such as switching operations, on the received ingress data 120. After processing such packet data, the network device 110 may communicate the processed packet data, as egress data 130, to corresponding network destinations, such as may be determined during the processing performed by the network device 110. During processing, packet data may be stored in an internal packet memory included in the network device 100 or, alternatively, packet data may be stored in an external packet memory 140 that is operationally coupled with the network device 110, e.g., after being buffered in an internal packet memory buffer.

As shown in FIG. 1, the network device 110 includes a dynamically allocated interface 115 that is configured to communicate packet data to and from the external packet memory 140. The interface 115 and the external packet memory 140 may include serializer-deserializer circuits (SERDES) that are used to communicate packet data between the network device 110 and the external packet memory 140. As described herein, bandwidth of the interface 115 may be dynamically allocated based on respective congestion states of an internal packet memory buffer (internal packet buffer or packet memory buffer) of the network device 110 and the external packet memory 140 (e.g., based on how much data is stored in one or both memories).

In an example embodiment, the network device 110 is configured to handle accounting of the amounts of data stored in each of the internal packet memory buffer and the external packet memory 140. Accordingly, in such an approach, the network device 110 may be configured to determine congestion states (e.g., using the techniques descried herein) for both the internal packet memory buffer and the external packet memory 140, without having to communicate with the external packet memory 140 to determine its congestion state (e.g., based on an amount of stored data). The network device 110 may then use such determined congestion states to dynamically allocate the bandwidth of the interface 115.

In such an approach, because the bandwidth (e.g., read bandwidth and write bandwidth) of the interface 115 is allocated based on respective congestion states of the internal packet memory buffer and/or the external packet memory 140, utilization of that bandwidth may be improved as compared to implementations that use fixed bandwidth allocations. Also, by improving the bandwidth utilization of the interface 115 using the dynamic bandwidth allocation techniques described herein, the network device 110 may be capable of processing higher volumes of data traffic and reducing data traffic congestion more rapidly using fewer SERDES than would be employed in approaches using fixed bandwidth allocations that are capable of handling similar data traffic volumes.

Figure 2:
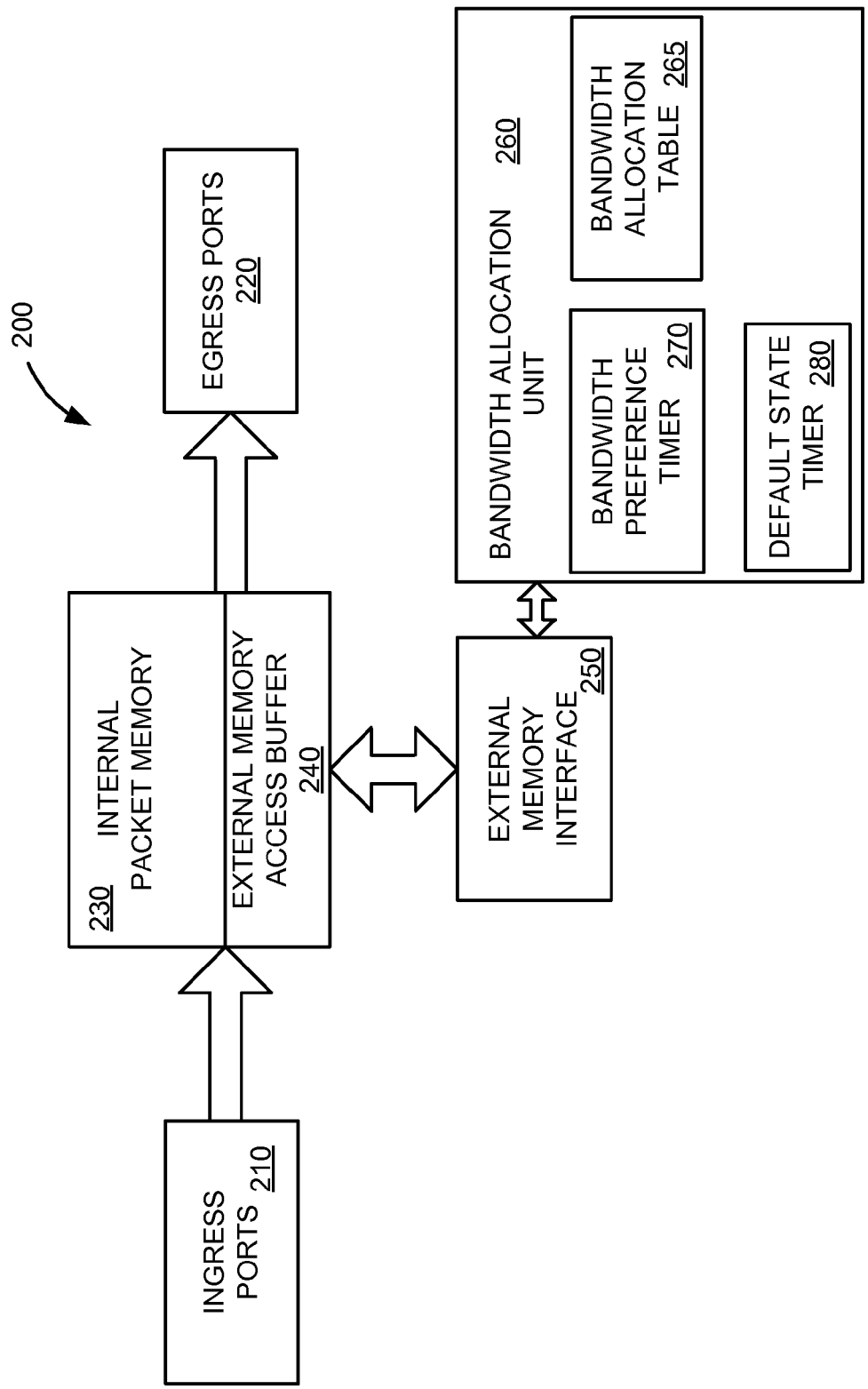
FIG. 2 is a block diagram of a network device in accordance with an example embodiment.

FIG. 2 is a block diagram illustrating a network device 200. The network device 200 is shown by way of example and other arrangements are possible. For instance, the network device 200 may include a number of packet processing stages, or other functional blocks. For purposes of brevity and clarity, such elements are not shown in FIG. 2. In other approaches, the elements of the network device 200 may be arranged in other appropriate fashions. In an example embodiment, the network device 200 may be implemented as the network device 110 in the circuit 100.

As shown in FIG., 2, the network device 200 includes ingress ports 210 that may be used to receive packet data, such as the ingress data 120 shown in FIG. 1. The network device 200 also includes egress ports 220 that may be used to forward the processed packet data (e.g., egress data 130) to corresponding network destinations. In the network device 200, the ingress ports 210 and the egress ports 220 are operationally coupled with an internal packet memory 230. In an example embodiment, the ingress ports 120 and the egress ports 130 may be operationally coupled with the internal packet memory 230 via one or more packet processing stages.

The network device 200 also includes an external memory access (EMA) buffer 240. The EMA buffer 240, as shown in FIG. 2, may be implemented in conjunction with the internal packet memory 230, such as by defining a logical partition in a packet memory structure. In other embodiments, the EMA buffer 240 may be implemented separately from the internal packet memory 230. For purposes of this discussion, the internal packet memory 230 and the EMA buffer 240 are described as functionally separate entities.

In the network device 200, the EMA buffer 240 is operationally coupled with an external memory interface 250. In an example embodiment, the network device 200 may be configured to temporarily store packet data in the EMA buffer 240 before writing the packet data to an external packet memory (not shown in FIG. 2) via the external memory interface 250. Such a situation may occur when the network device 200 is oversubscribed and the internal packet memory 230 is full or nearly full, indicating data traffic congestion due to the network device 200 receiving a volume of data traffic that is above a bandwidth that the network device 200 can process using only the internal packet memory 230. In an example embodiment, packet data may be placed in the EMA buffer 240 to be written to external packet memory only when the internal packet memory 230 is full, nearly full, or has a sufficient amount of data to indicate congestion of one or more egress ports 220 of the network device 200, which could be based on one or more congestion thresholds. In other embodiments, the network device 200 may write all received packet data to an external packet memory during processing (e.g., after buffering the packet data in the EMA buffer 240). The specific approach for storing received packet data during processing may depend on one or more aspects of the particular embodiment, such as expected traffic patterns of a given network device.

The network device 200 also includes a bandwidth allocation unit 260 that is operationally coupled with the external memory interface 250. Alternatively, the bandwidth allocation unit 260 may be implemented in the external memory interface 250 rather than as a separate functional entity. In an example embodiment, the external memory interface 250 and the bandwidth allocation unit 260 may be implemented as the interface 115 of the network device 110 shown in FIG. 1.

The bandwidth allocation unit 260 may be configured to dynamically allocate respective portions of the bandwidth of the external memory interface 250 to read operations (from an external packet memory) and write operations (to an external packet memory) using a bandwidth allocation table 265 that is included in the bandwidth allocation unit 260. For instance, the bandwidth allocation unit 260 may determine the respective bandwidth allocations for read and write operations by indexing the bandwidth allocation table 265 using an index that indicates the respective congestion states of the EMA buffer 240 and/or an external packet memory that is operationally coupled with the network device 200, such as using the techniques described herein. An example bandwidth allocation table is described in further detail below with reference to FIG. 4.

The bandwidth allocation unit 260 of the network device 250 also includes a bandwidth preference timer 270 and a default state timer 280. The bandwidth preference timer 270 may be configured to limit an amount of time the bandwidth allocation unit 260 can dynamically allocate bandwidth of the external memory interface 250. In an example embodiment, the bandwidth preference timer 270 may be configured to start (e.g., either counting up to a predetermined value or counting down from a predetermined value) when the network device 200 begins dynamically allocating bandwidth. Alternatively, the bandwidth preference timer 270 may be configured to start when a specific level of congestion is detected in the internal packet memory 230 or the external packet memory 140. The network device 200 may be configured to stop dynamic bandwidth allocation upon expiration of the bandwidth preference timer 270.

Such an approach may improve performance of the network device 200 as it may reduce the likelihood that dynamic allocation of the bandwidth of the external memory interface 250 would allow a persistent congestion state to continue in the network device 200 and/or the external memory interface 250. For instance, the external memory interface 250 may be configured to enter a hold state using default bandwidth allocations (e.g., 50 percent for read operations and 50 percent for write operations) upon expiration of the bandwidth preference timer 270. Entering the hold state may cause the network device 200 to trigger other congestion management mechanisms that might not be triggered otherwise. Examples of such congestion management mechanisms include dropping packets, pausing one or more data flows being processed by the network device 200, or requesting that network devices communicating data to the network device 200 reduce their transmission rates.

The network device 200 may also limit an amount of time the external memory interface 250 operates in the hold state using the default state timer 280. For instance, the default state timer 280 may be configured to start when the external memory interface 250 enters the hold state. The network device 200 may be configured to, upon expiration of the default state timer, determine whether the congestion still exists (e.g., based on the respective congestion states) and, if the congestion still exists, resume dynamic bandwidth allocation.

Figure 3A:
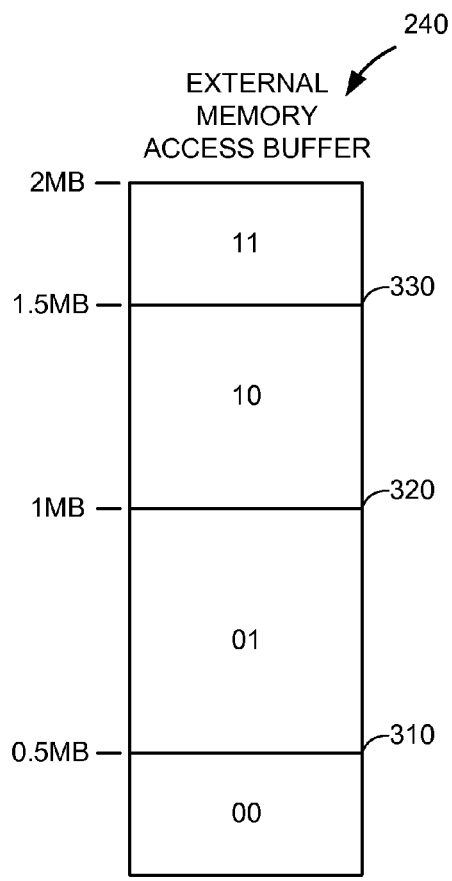
FIGS. 3A and 3B are diagrams illustrating congestion thresholds in accordance with example embodiments.
Figure 3B:
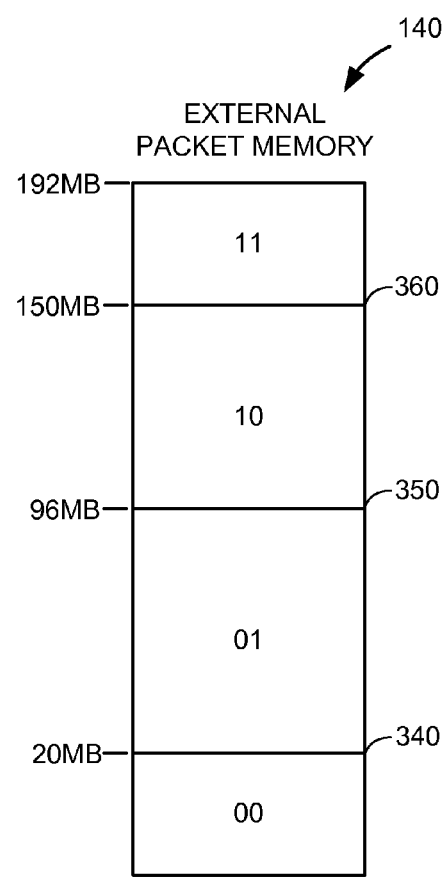

FIGS. 3A and 3B are diagrams illustrating congestion thresholds that may be used by the network device 200 (e.g., in the bandwidth allocation unit 260) to determine respective congestion states for the EMA buffer 240 of the network device 200 and an external packet memory, such as the external packet memory 140, that is operationally coupled with the network device 200. FIGS. 3A and 3B are each illustrated using three thresholds. In an example embodiment, these thresholds may be user configurable based on the particular implementation. Using three thresholds allows for defining four congestion states, which may be represented by corresponding congestion state values, as are shown in FIGS. 3A and 3B. In other approaches, fewer or additional thresholds may be used, which would, respectively, decrease and increase granularity of the congestion states that may be defined.

As shown in FIG. 3A, the EMA buffer 240 may be a 2 MB packet memory buffer, though in other embodiments other sizes of EMA buffers may be used. In this example, three internal congestion state thresholds 310, 320 and 330 are evenly distributed at 0.5 MB, 1.0 MB and 1.5 MB of the EMA buffer 240, with respective congestion state values ("00," "01," "10" and "11" being associated with each range of the EMA buffer 240 as defined by the congestion thresholds. The network device 200 (e.g., using the bandwidth allocation unit 260) may determine a congestion state value for the EMA buffer 240 by determining how much data is currently stored in the EMA buffer 240 and comparing the determined amount of data with the internal congestion state thresholds 310, 320 and 330. For example, if it is determined that 0.4 MB of data is currently stored in the EMA buffer 240, the bandwidth allocation unit 260 would determine a congestion state threshold value of "00" for the EMA buffer 240. Likewise, if it is determined that 1.3 MB of data is currently stored in the EMA buffer 240, the bandwidth allocation unit 260 would determine a congestion state threshold of "10" for the EMA buffer 240.

Referring now to FIG. 3B, the bandwidth allocation unit 260 may determine a congestion state threshold value for the external packet memory 140 in a similar fashion based on external congestion state thresholds 340, 350 and 360. As compared to the internal congestion state thresholds 310, 320 and 330 shown in FIG. 3A, the external congestion state thresholds 340, 350 and 360 are not evenly distributed across the external packet memory 140. Accordingly, some ranges of the external packet memory 140, as defined by the external congestion state thresholds 340, 350 and 360 are larger than others. As noted above, the congestion state thresholds 310-360 may be user configurable and the values used may be selected based on the particular implementation.

Once congestion state values are determined for both the EMA buffer 240 and the external packet memory 140, the bandwidth allocation unit 260 may concatenate those congestion state values to produce a congestion state index. The bandwidth allocation unit 260 may then index the bandwidth allocation table 265 using the congestion state index and dynamically allocate bandwidth of the external memory interface 250 based on an entry in the bandwidth allocation table 265 that corresponds with the congestion state index. In other embodiments, the bandwidth allocation unit 260 may use only the internal congestion state value or the external congestion state value to index the bandwidth allocation table 265, e.g., dynamic bandwidth allocations may be determined using only an internal congestion state or an external congestion state.

FIG. 4 is a diagram illustrating an example bandwidth allocation table 400 that may be used to dynamically allocate bandwidth of an external packet memory interface in accordance with the techniques discussed herein. In an example embodiment, the bandwidth allocation table 400 may be used to implement the bandwidth allocation table 265 shown in FIG. 2. For purposes of brevity, the following discussion does not describe each and every entry of the bandwidth allocation table 400 in detail.

The bandwidth allocation table 400 includes columns for "External Congestion State Value," "Internal Congestion State Value" and "Congestion State Index," which were discussed above with respect to FIGS. 3A and 3B. The bandwidth allocation table 400 also includes columns for Read Bandwidth Allocation, as a percentage of total available bandwidth, and Write Bandwidth Allocation, as a percentage of total available bandwidth, where the sum of the values in these columns for a given row equals one-hundred percent. In an example embodiment, the allocations included in the bandwidth allocation table 400 may be user-configurable.

The bandwidth allocation table 400 is shown for purposes of illustration and other arrangements are possible. For instance, in some embodiments, a bandwidth allocation table may be implemented using only two columns, e.g., columns for Congestion State Index and Read Bandwidth Allocation. In such an approach, the respective write bandwidth allocation for each congestion state index may be determined by subtracting the read bandwidth value associated with a given congestion state index (e.g., from a corresponding entry in the bandwidth allocation table 400) from one-hundred percent. Alternatively, a column for Write Bandwidth Allocation may be used in place of the Read Bandwidth Allocation column. In other approaches, bandwidth allocations may be defined as an actual bandwidth value, rather than a percentage of available bandwidth. In such approaches, a single bandwidth allocation (write or read) column may be used and the corresponding bandwidth allocation (read or write, respectively) may be determined by subtracting the given bandwidth allocation from the total available bandwidth. As yet another alternative, a bandwidth allocation table could be implemented using one of an internal congestion state or an external congestion state to index the table.

The bandwidth allocation table 400 may be used to dynamically allocate read and write bandwidth allocations for an external packet memory interface, such as the external memory interface 250 of the network device 200. As shown in FIG. 4, the first column in the bandwidth allocation table 400 includes external congestion state values, which correspond with the external congestion state values shown in FIG. 3B. The second column in the bandwidth allocation table 400 includes internal congestion state values, which correspond with the internal congestion state values shown in FIG. 3A. The third column of the bandwidth allocation table 400 includes congestion state index values, which are a concatenation of the respective external congestion state value and the respective internal congestion state value for each row of the bandwidth allocation table 400. As was noted above, in other embodiments, a bandwidth allocation table could include only the congestion state index column, while excluding the two congestion state value columns. As was also noted above, in still other embodiments, a bandwidth allocation table could include only one of the congestion state value columns, while excluding the congestion state index column and the other congestion state value column.

The fourth column of the bandwidth allocation table 400 includes respective read bandwidth allocations that correspond with the congestion state index for each row of the table 400. The fifth column of the bandwidth allocation table includes respective write bandwidth allocations that correspond with the congestion state indices for each row of the table 400. As was discussed above, other bandwidth allocation table implementations may only include a read bandwidth allocation column or a write bandwidth allocation column. In such approaches, the bandwidth allocation that is given may be used to calculate the other corresponding bandwidth allocation.

The bandwidth allocation table 400 shows one example of how bandwidth of an external memory interface may be dynamically allocated to read and write operations using the techniques described herein. Of course, a number of other approaches are possible. In the example shown in FIG. 4, the first four rows of the bandwidth allocation table 400 represent bandwidth allocations for each of the internal congestion state values shown in FIG. 3B, while the external congestion state value remains constant at '00' (i.e., congestion states indices '0000', '0001', '0010' and '0011'). Accordingly, the first four rows of the bandwidth allocation table 400 illustrate bandwidth allocations that may be used to allocate bandwidth of an external packet memory interface, such as the external memory interface 250, for each of the internal congestion states shown in FIG. 3A when there is little to no congestion in an associated external packet memory (e.g., congestion state '00' in FIG. 3B), such as the external packet memory 140.

As is shown in the first four rows of FIG. 4, as congestion increases in the EMA buffer 240 (as indicated by the internal congestion state value) when there is little to no congestion in the external packet memory 140, additional bandwidth may be dynamically allocated for external memory write operations (e.g., from the EMA buffer 240 to the external packet memory 140) at the expense of memory read operations (e.g., from the external packet memory 140 to the EMA buffer 140). For example, where the congestion state index is '0000' (as shown in row one of the table 400), which indicates that there is little or no congestion in either the external packet memory 140 or the EMA buffer 240, the bandwidth allocation table 400 may be used to dynamically allocate fifty percent of the external memory interface bandwidth to write operations, and fifty percent for read operations, which may also represent bandwidth allocations for a default bandwidth allocation state.

However, when the congestion state index is '0011' (as shown in row four of the table 400), which indicates that there is little or no external congestion and extremely high internal congestion, the bandwidth allocation table 400 may be used to dynamically allocate ninety percent of the external memory interface bandwidth to write operations, with the remaining ten percent being allocated for read operations. Further, as illustrated in the second and third rows of the bandwidth allocation table 400, less aggressive write bandwidth allocation preferences may be used for the intermediate internal congestion state values '01' and '10' when the external congestion state value is '00', respectively sixty percent and eighty percent. Such an approach may allow a network device to absorb transient traffic bursts more efficiently, because more external memory bandwidth is available to write packet data from the EMA buffer 240 to the external memory 140 during a traffic burst. This approach provides for draining the EMA buffer more quickly during transient traffic bursts than using fixed bandwidth allocations, because the amount of bandwidth dynamically allocated to write operations increases as congestion in the EMA buffer 240 increases (e.g., such as indicated by the internal congestion state value and the congestion state index).

As is shown in the last four rows of FIG. 4, when congestion is extremely high in the external packet memory 140 (i.e., the external congestion state value is '11'), additional bandwidth may be dynamically allocated for external memory read operations (e.g., from the external packet memory 140 to the EMA buffer 240) at the expense of memory write operations (e.g., from the EMA buffer 240 to the external packet memory 140) when the internal congestion state value for the EMA buffer 240 is '00', '01' or '10'. In such an approach, the bandwidth preference for read memory operations may decrease as the internal congestion state increases. For example, where the congestion state index is '1100' (as shown in the fourth from last row of the table 400), which indicates that there is little or no congestion in the EMA buffer 240, the bandwidth allocation table 400 may be used to dynamically allocate ninety percent of the external memory interface bandwidth to read operations, and ten percent for write operations.

However, when the congestion state index is '1111' (as shown in the last row of the table 400), which indicates that there is extremely high internal external and internal congestion, the bandwidth allocation table 400 may be used to allocate fifty percent of the external memory interface bandwidth to write operations and fifty percent for read operations. In this situation, a bandwidth preference for read or write operations may not provide any benefit, as both the internal congestion state and the external congestion state are extremely high. In this situation, other congestion management techniques may be used, such as flow control and/or dropping packets, as two example.

Further, as illustrated in the second to last and third to last rows of the bandwidth allocation table 400, less aggressive read bandwidth allocation preferences may be used for the intermediate internal congestion state values '01' and '10' when the external congestion state value is '11', respectively seventy percent and fifty-five percent. Such an approach may allow a network device to prevent underutilization of the egress ports 220 of the network device 200, by allowing the packet data stored in the external packet memory 140 to be read more quickly in order to maintain utilization of the available bandwidth of the egress ports 220.

In some embodiments, a read bandwidth preference (such as shown for the congestion state indices '1100', '1101' and '1110' in the table 400) may operate as an upper limit for read bandwidth allocation. For instance, the network device 200 may experience a traffic burst that is associated with a single egress port and write packet data associated with that burst to the external packet memory 140 during the burst. If the external packet memory 140 does not have packet data associated with the other egress ports 220 stored in it, using a read bandwidth preference of ninety percent may exceed the available bandwidth of the egress port associated with the data stored in the external packet memory 140. In such instances, as well as a number of other situations, the network device 200 may issue requests to read packet data from the external packet memory 140 at a rate (bandwidth) that is below a read bandwidth allocation indicated in a corresponding bandwidth allocation table for a given congestion state or congestion state index, for example. In such instances, the network device 200 may be configured to "recycle", the unused portion of the read bandwidth allocation to external memory write operations, e.g., reallocate the amount of the read bandwidth allocation that exceeds the read bandwidth that is actully used by the network device 200 to write operations.

In the table 400, rows five to eight illustrate example bandwidth allocations for each of the internal congestion state values shown in FIG. 3A when the external congestion state value is '01'. Rows nine to twelve of the table 400 illustrate example bandwidth allocations for each of the internal congestion state values shown in FIG. 3A when the external congestion state value is '10'. The bandwidth allocations shown in FIG. 4 are given by way of example and a number of other arrangements are possible. The particular bandwidth allocations included in such a bandwidth allocation table may depend on a number of factors. For instance, the bandwidth allocations may depend on the traffic patterns an associated network device experiences, the available bandwidth of an external memory interface, the number of ingress and egress ports of a network device and/or the bandwidth of the ingress and egress ports of the network device, among other considerations.

Figure 5:
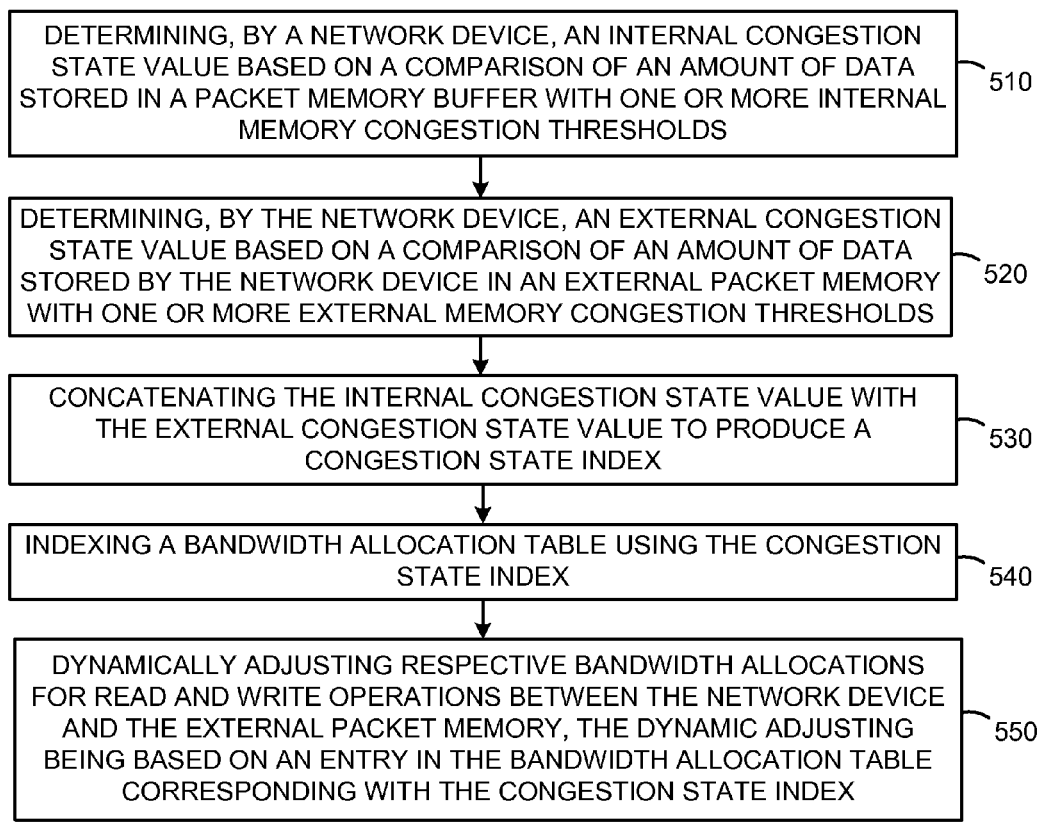
FIG. 5 is a flowchart illustrating a method of allocating bandwidth in accordance with an example embodiment.

FIG. 5 is a flowchart illustrating a method 500 for dynamically allocating bandwidth for external packet memory operations. The method 500 may be implemented, for example, in the network device 200 shown in FIG. 2 using the techniques described herein. It will be appreciated that the method 500 may be implemented in other devices using a number of appropriate techniques. For purposes of illustration, the method 500 will be described with further reference to FIGS. 1-4.

The method 500, at block 510, includes determining, by a network device, such as the network device 200, an internal congestion state value for a packet memory buffer, such as the EMA buffer 240. As discussed with respect to FIG. 3A, the internal congestion state value may be determined by comparing an amount of data stored in the EMA buffer 240 with one or more internal congestion thresholds (e.g., the thresholds 310, 320 and 330). At block 520, the method 500 includes determining, by the network device 200, an external congestion state value for an external packet memory, such as the external packet memory 140. As discussed above with respect to FIG. 3B, the external congestion state value may be determined by comparing an amount of data stored in the external packet memory 140 with one or more external congestion thresholds (e.g., the thresholds 340, 350 and 360).

The method 500 further includes, at block 530, concatenating the internal congestion state value and the external congestion state value to produce a congestion state index, such as those illustrated in FIG. 4, for example. At block 540, the method 500 includes indexing a bandwidth allocation table, such as the bandwidth allocation table 400, using the congestion state index. As was discussed above, in other embodiments, a bandwidth allocation table may be indexed at block 540 using either the internal congestion state value determined at block 510 or the external congestion state value determined at block 520 in place of the congestion state index of block 540. In such approaches, block 530, as well as one of blocks 510 and 520 (depending on which congestion state value is used as an index) may be eliminated in the method 500.

At block 550, the method 500 still further includes dynamically adjusting respective bandwidth allocations for memory read and memory write operations for an external memory interface, such as the external memory interface 250. The dynamic bandwidth allocations performed at block 550 may be based on an entry in the bandwidth allocation table 400 that corresponds with the congestion state index produced at block 530. Such bandwidth allocations may be determined using the techniques described above.

Figure 6:
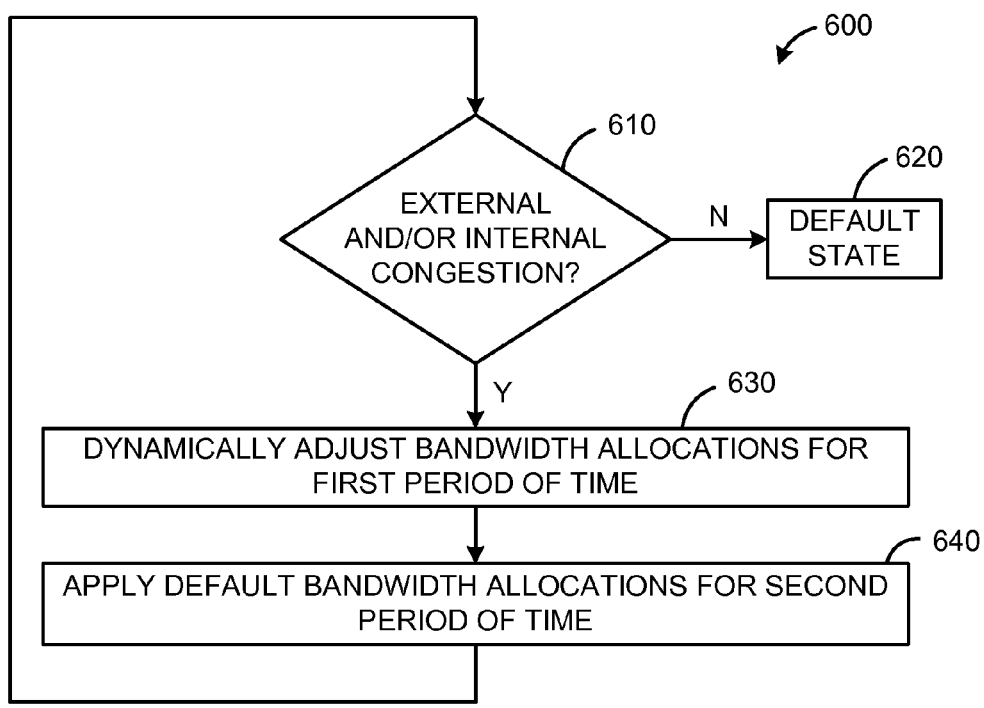
FIG. 6 is a flowchart illustrating a method of allocating bandwidth in accordance with an example embodiment.

FIG. 6 is a flowchart illustrating a method 600 of allocating bandwidth in accordance with an example embodiment. The method 600 may be implemented to limit an amount of time an external memory interface of a network device performs dynamic bandwidth allocation. As with the method 500, the method 600 may be implemented in the network device 200 shown in FIG. 2 using the techniques described herein. It will be appreciated, however, that the method 600 may be implemented in other devices using a number of appropriate techniques. For purposes of illustration, the method 600 will be described with further reference to FIGS. 1-4.

As shown in FIG. 6, the method 600 includes, at block 610, determining whether one or both of an internal packet buffer of a network device and an external packet memory operationally coupled with the network device are congested. This determination may be based on a comparison of an amount of data stored in the EMA buffer 240 of the network device 200 with one or more internal congestion thresholds, such as the internal congestion thresholds 310, 320 and 330 that were discussed with respect to FIG. 3A. Likewise, the determination at block 610 may also, or alternatively, be based on a comparison of an amount of data stored in the external packet memory 140 with one or more external congestion thresholds, such as the external congestion thresholds 340, 350 and 360 that were discussed with respect to FIG. 3B.

In other embodiments, other techniques may be used to determine the presence of congestion. For example, a single congestion threshold could be used for the EMA buffer 240. In such an approach, if an amount of data stored in the EMA buffer 240 exceeds the congestion threshold, the the bandwidth of the external memory interface 250 may be dynamically allocated in accordance with a bandwidth allocation table, such as describe herein. Of course, a number of other techniques are possible. In other embodiments, the determination at block 610 may include determining (e.g., in addition to, or in place of determining whether the EMA buffer 240 is congested) whether the external packet memory 140 is congested based, for example, on a congestion state value for the external packet memory 140 or comparison of an amount of data stored in the external packet memory with an external congestion threshold.

If, at block 610, it is determined that congestion is not present, the method 600 proceeds to block 620, and the network device enters a default state, where the network device 200 may use default bandwidth allocations for external memory access, such as fifty percent for reads and fifty percent for writes. However, if it is determined at block 610 that congestion exists, the method 600 proceeds to block 630. At block 630, the method 600 includes dynamically adjusting bandwidth allocations (such as in the manners described herein) for a first period of time. The amount of time the network device 200 dynamically adjusts the bandwidth allocations may be determined using the bandwidth preference timer 270 shown in FIG. 2 and described above.

After the first period of time has expired, the method 600 proceeds to block 640 and the network device 200 enters a hold state, where default bandwidth allocations are applied for a second period of time. As was discussed above with respect to FIG. 2, the amount of time the network device remains in the hold state may be determined using the default state timer 280, such as in the manner described above.

After the second period of time has expired, the method 600 returns to block 610, where it is determined whether congestion is still present. If is no longer present, the method 600 proceeds to block 620 and the network device 200 enters the default state. However, if is determined at block 610 that congestion is still present, the operations of block 630, 640 and 610 are repeated until it is determined that the congestion that triggered dynamic bandwidth allocation has been resolved.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    determining, by a network device, at least one of:
        a congestion state of a packet memory buffer of the network device; and
        a congestion state of an external packet memory that is operationally coupled with the network device;
    determining, by the network device: 1) an internal congestion state value of the packet memory buffer 2) an external congestion state value of the external packet memory and 3) a congestion state index based on the internal and external congestion state values; and
    dynamically adjusting, by the network device, respective bandwidth allocations for read and write operations between the network device and the external packet memory, the dynamic adjusting being based on the determined congestion state of the packet memory buffer and/or the determined congestion state of the external packet memory and further being based on the determined congestion state index.

2. The method of claim 1, wherein determining the congestion state of the internal packet memory buffer comprises:
    comparing, by the network device, an amount of data stored in the packet memory buffer with one or more internal memory congestion thresholds; and
    determining, based on the comparison, an internal congestion state value,
    wherein the bandwidth allocations are dynamically adjusted based on the internal congestion state value.

3. The method of claim 2, wherein the internal congestion state thresholds are user configurable.

4. The method of claim 1, wherein determining the congestion state of the external packet memory comprises:
    comparing, by the network device, an amount of data stored by the network device in the external packet memory with one or more external memory congestion thresholds; and
    determining, based on the comparison, an external congestion state value,
    wherein the bandwidth allocations are dynamically adjusted based on the external congestion state value.

5. The method of claim 4, wherein the external congestion state thresholds are user configurable.

6. The method of claim 1, further comprising:
    determining the internal congestion state value based on a comparison of an amount of data stored in the packet memory buffer with one or more internal memory congestion thresholds;
    determining the external congestion state value based on a comparison of an amount of data stored by the network device in the external packet memory with one or more external memory congestion thresholds; and
    concatenating the internal congestion state value with the external congestion state value to produce the congestion state index.

7. The method of claim 1, wherein dynamically adjusting the bandwidth allocations comprises:
    indexing a bandwidth allocation table using the congestion state index; and
    adjusting the bandwidth allocations based on an entry in the bandwidth allocation table corresponding with the congestion state index.

8. The method of claim 7, wherein the bandwidth allocation table is user configurable.

9. The method of claim 1, further comprising, while the network device is oversubscribed, limiting an amount of time the bandwidth allocations are dynamically adjusted.

10. The method of claim 1, further comprising, while the network device is oversubscribed, implementing default bandwidth allocations after dynamically adjusting the bandwidth allocations for a first period of time; wherein the default bandwidth allocations are implemented for a second period of time, after which, if the network device is still oversubscribed, the method further comprises resuming dynamic adjustment of the bandwidth allocations.

11. The method of claim 1, wherein, while the network device is oversubscribed, dynamically adjusting the bandwidth allocations comprises adjusting the bandwidth allocations to increase a write bandwidth allocation.

12. The method of claim 1, wherein, while the network device is underutilized, dynamically adjusting the bandwidth allocations comprises adjusting the bandwidth allocations to increase a read bandwidth allocation.

13. A network device comprising a non-transitory machine readable storage medium having instructions stored thereon, wherein the instructions, when executed by the network device, cause the network device to:
 determine at least one of:
  a congestion state of a packet memory buffer of the network device; and
  a congestion state of an external packet memory that is operationally coupled with the network device;
 determine an internal congestion state value of the packet memory buffer;
 determine an external congestion state value of the external packet memory;
 determine a congestion state index based on the internal and external congestion state values: and
 dynamically adjust respective bandwidth allocations for read and write operations between the network device and the external packet memory, the dynamic adjusting being based on the determined congestion state of the packet memory buffer and/or the determined congestion state of the external packet memory and further being based on the determined congestion state index.

14. The network device of claim 13, wherein the instructions, when executed by the network device, further cause the network device to:
 determine the internal congestion state value based on a comparison of an amount of data stored in the packet memory buffer with one or more internal memory congestion thresholds;
 determine the external congestion state value based on a comparison of an amount of data stored by the network device in the external packet memory with one or more external memory congestion thresholds; and
 concatenate the internal congestion state value with the external congestion state value to produce the congestion state index.

15. The network device of claim 13, wherein the instructions, when executed by the network device, further cause the network device to, while the network device is oversubscribed, implement default bandwidth allocations after dynamically adjusting the bandwidth allocations for a first period of time;
 wherein the default bandwidth allocations are implemented for a second period of time, after which, if the network device is still oversubscribed, the instructions, when executed by the network device, further cause the network device to resume dynamically adjusting the bandwidth allocations.

16. A network switch comprising:
 an external memory interface configured to operationally couple the network switch with an external packet memory;
 a packet memory buffer configured to temporarily store data packets prior to writing the data packets to the external packet memory via the external memory interface; and
 a bandwidth allocation unit configured to:
  determine at least one of:
   a congestion state of the packet memory buffer; and
   a congestion state of the external packet memory;
  determine 1) an internal congestion state value of the packet memory buffer 2) an external congestion state value of the external packet memory and 3) a congestion state index based on the internal and external congestion state values; and
  dynamically adjust respective bandwidth allocations for read and write operations between the network device and the external packet memory, the dynamic adjusting being based on the determined congestion state of the packet memory buffer and/or the determined congestion state of the external packet memory and further being based on the determined congestion state index.

17. The network device of claim 16, further comprising:
 a first timer configured to, while the network switch is oversubscribed, limit an amount time the switch dynamically adjusts the bandwidth allocations, after which the network switch operates using default bandwidth allocations; and
 a second timer configured to, while the network switch is oversubscribed, limit an amount of time the network switch uses the default bandwidth allocations.

18. The network device of claim 16, wherein the bandwidth allocation unit is further configured to:
 determine the internal congestion state value based on a comparison of an amount of data stored in the packet memory buffer with one or more internal memory congestion thresholds;
 determine the external congestion state value based on a comparison of an amount of data stored by the network device in the external packet memory with one or more external memory congestion thresholds;
 concatenate the internal congestion state value with the external congestion state value to produce the congestion state index.

19. The network device of claim 16, wherein the bandwidth allocation unit is further configured to:
 while the network device is oversubscribed, dynamically adjust the bandwidth allocations to increase a write bandwidth allocation; and
 while the network device is underutilized, dynamically adjust the bandwidth allocations to increase a read bandwidth allocation.

* * * * *